United States Patent [19]

Blechmann

[11] 4,330,942
[45] May 25, 1982

[54] LENGTH-MEASURING PROBE FOR MEASUREMENT

[75] Inventor: Rüdi Blechmann, Wipperfürth, Fed. Rep. of Germany

[73] Assignee: Klingelnberg Söhne, Remscheid, Fed. Rep. of Germany

[21] Appl. No.: 244,707

[22] Filed: Mar. 17, 1981

[51] Int. Cl.³ .......................... G01B 5/00; G01B 5/20
[52] U.S. Cl. ................................ 33/169 R; 33/172 B; 33/174 P
[58] Field of Search ............ 33/169 R, 172 B, 174 P, 33/174 Q, 179.5 R, 179.5 A, 179.5 D

[56] References Cited
U.S. PATENT DOCUMENTS

| | | | |
|---|---|---|---|
| 3,845,561 | 11/1974 | Elsdoerfer | 33/169 R |
| 3,936,946 | 2/1976 | Ruffner et al. | 33/179.5 R |
| 3,945,124 | 3/1976 | Jacoby et al. | 33/169 R |
| 3,946,492 | 3/1976 | Du Bose, Jr. | 33/169 R |
| 3,987,551 | 10/1976 | Kience | 33/169 R |
| 4,130,941 | 12/1978 | Amsbury | 33/172 E |

Primary Examiner—Willis Little
Attorney, Agent, or Firm—Becker & Becker, Inc.

[57] ABSTRACT

A length-measuring probe for gear measurement. The probe comprises a planar four-bar-guide with four hinges, each formed by plate springs; a stylus linearly guided by the bar-guide; a device for measuring the displacement of the stylus; and an additional coil spring which is adjustably arranged between the respective bars of each hinge in such a way that the plate springs are prestressed by a tensile force which decreases when the plate springs are deflected in either direction.

4 Claims, 3 Drawing Figures

Fig. 3

LENGTH-MEASURING PROBE FOR MEASUREMENT

The present invention relates to a length-measuring probe having a large measuring range, particularly for measurements on gears, and comprises a feeler or tracer-point stylus, which is linearly guided by a two-dimensional or planar four-bar hinged guide, whereby the four hinges comprise plate springs and are held in the rest position thereby; the probe further comprises a measuring device which measures all deflections of the feeler or stylus out of the rest position.

Length-measuring probes are needed for involute and pitch measurement, especially on large spur gears. Such length measuring probes have a large measuring range with high measuring accuracy. Even though the deflections or deviations from the real measure often amount to only a few micrometers, the real measure can fluctuate in a large range. Consequently, a precondition for the measuring probe includes the fact that for static reasons the measuring force must be substantially constant over the linear measuring path.

Measuring probes are known which operate with glass measuring rods, and which fulfill the foregoing requirement. With these glass measuring rods, the longitudinal axis of the feeler or stylus lies in the direction of the measuring path.

However, for gear measurement, a length-measuring probe is needed which has a feeler or stylus projecting into the tooth gaps, and is hence located at right angles to the direction of the measuring movement or deflection. Since with this arrangement the Abbe principle is violated, the feeler or stylus must, in order to achieve the required degree of accuracy of measurement, be guided linearly in an especially accurate and stable manner, but still in a manner low in friction and inertia. An additional difficulty with gear measurement is that even with correct application of the feeler or stylus, the measuring force upon the feeler is not always in the measuring direction. Thus, for example with spur gears, the measuring force differs from this direction by the angle of inclination and brings about an additional deflection moment on the stylus or feeler guidance.

In such situations, linear guidances were previously installed for the stylus or feeler, and these straight guidances comprise a lever mechanism, for example a parallelogram-type system corresponding to the disclosure of German Offenlegungsschrift No. 27 05 757, or a four-part hinge corresponding to the disclosures of German Offenlegungsschrift No. 23 64 917 and German Offenlegungsschrift No. 26 11 476, whereby the hinges are formed of plate springs to keep the friction as small as possible. These known devices have two decisive disadvantages as follows:

(a) Under bending load about an axis at right angles to the pivot axis, the plate springs bend sharply or buckle in the narrow region (in which they form the hinge) in the pressure zone, which not only influences the measuring accuracy considerably, but ultimately can also lead to breakage of the plate springs.

This disadvantageous effect occurs even more strongly when the bending angle of the plate springs is larger. The angle, however, cannot be kept sufficiently small if the required large measuring range is to be attained with small measurements or calibrations.

(b) With a larger bending angle of the plate spring, the return moment additionally increases greatly which must be separately compensated for by additional or supplemental devices in the feeler or stylus in order to fulfill the requirement for nominal measuring force increase over the deflection of the feeler or stylus.

If thicker plate springs are used for increasing the stability, then the return moment is still greater, and together with the compensating device, the masses moved during the measuring become dead weight, i. e., are too slow. If, on the other hand, the feeler or stylus is more widely supported by several plate spring systems, it is unavoidable that even the smallest production differences still bring about a sudden snapping-over of individual springs of the system when the plate springs are near their extended or stretched position. In such a situation, there arises an unacceptable large deviation from the linearity of the feeler or stylus movement.

It is therefore an object of the present invention to eliminate the indicated disadvantages of the previously known plate spring hinges, and yet to completely fulfill the requirements for a highly accurate length-measuring probe for gear measurement.

This object, and other objects and advantages of the present invention, will appear more clearly from the following specification in connection with the accompanying drawings, in which:

FIG. 3 is a schematic illustration of the four-bar hinged guide arrangement with the spring mechanism of the present invention.

The length-measuring probe of the present invention is characterized primarily by arranging at least one additional adjustable spring between the two bars or members of each hinge; this additional spring prestresses or preloads the plate springs with a tension or pulling load, and the spring force of the additional spring decreases uniformly during deflection of the plate springs from their rest position.

In spite of this apparently contradictory measure or feature, the effect of this additional adjustable spring consists in that with the largest expected deflection moment, the plate springs do not bend sharply or buckle, and that simultaneously, in a very simple manner, upon deflection of the springs from their rest position, the return moment thereof is adequately compensated.

For this purpose, the additional springs are dimensioned and adjusted in such a way that in each position the sum of the energy stored in the springs is nearly constant. Accordingly, with the largest deflection of the plate springs, when the highest danger of sharp bending exists, the spring force of the additional spring is the smallest. However, the spring force of the additional spring can still give the plate springs such a high tension or pulling preloading or prestressing that the plate springs are not loaded under pressure with a bending moment which is effective at right angles to the axis of the hinges and which, because of conventional feeler or stylus securing, does not exceed a maximum amount. The increase of the prestressing or preloading as far as into the rest position can be readily endured by the plate springs as tension or pulling stress.

The advantageous arrangement and suspension of the additional spring additionally brings about that the feeler or stylus can move or pass without any jerkiness through the rest position of the springs over the entire measuring range, and the reversal time can hardly be noticed.

According to the same system, other plate spring mountings for measuring probes, such as cross-spring hinges, can also be stabilized and carried out with a constant measuring force.

Figure 1:
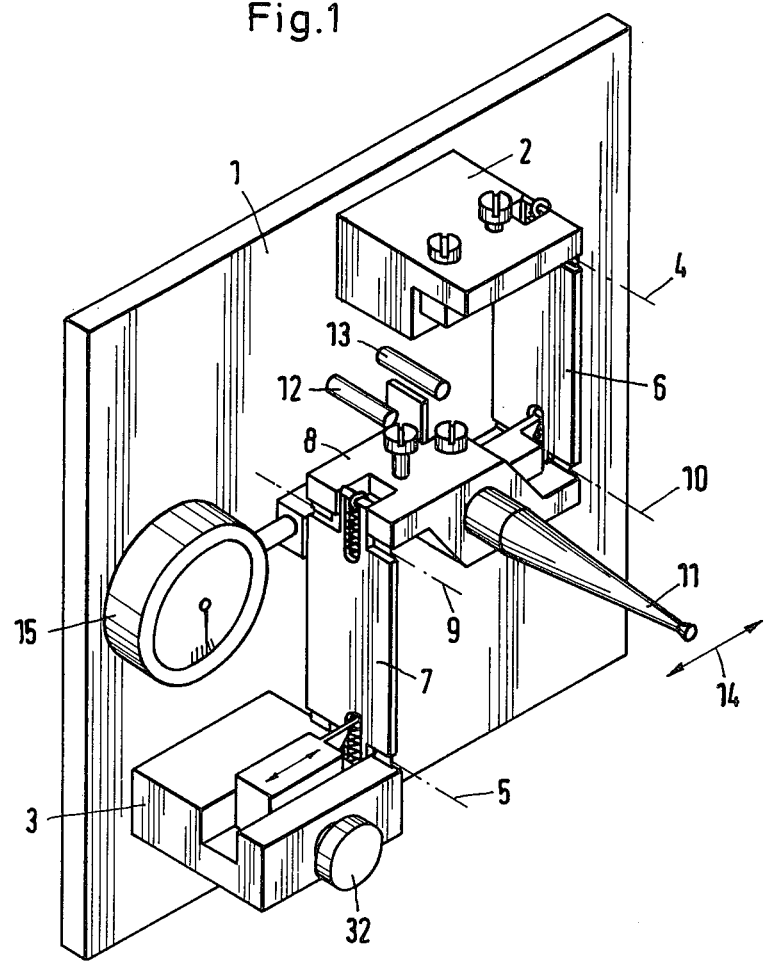
FIG. 1 is an isometric illustration of the length measuring probe in accordance with one embodiment of the present invention.

Referring now to the drawings in detail, the length-measuring probe illustrated in FIG. 1 comprises a base plate 1, upon which the bearing brackets or supports 2 and 3 are located. A link, rocker arm, or bar 6 and 7 is respectively connected to the supports 2, 3 so as to be rotatable about the axes 4 and 5 respectively. Both links 6 and 7 are of the same length, and their free ends are pivotally connected about the axes 9 and 10 by way of a coupling member or bar 8. This system produces a two-dimensional or planar four-bar hinged guide, the length relationships of which are fixed in a known manner in such a way that the feeler or stylus 11, which is fastened in the middle on the coupling member 8 between the axes 9 and 10 and parallel thereto, is capable of being linearly shifted in the direction of the arrow 14 between the abutments 12 and 13. The deflections or displacements of the feeler or stylus 11 are measured with a measuring device 15, which likewise is fastened on the base plate 1.

Figure 2:
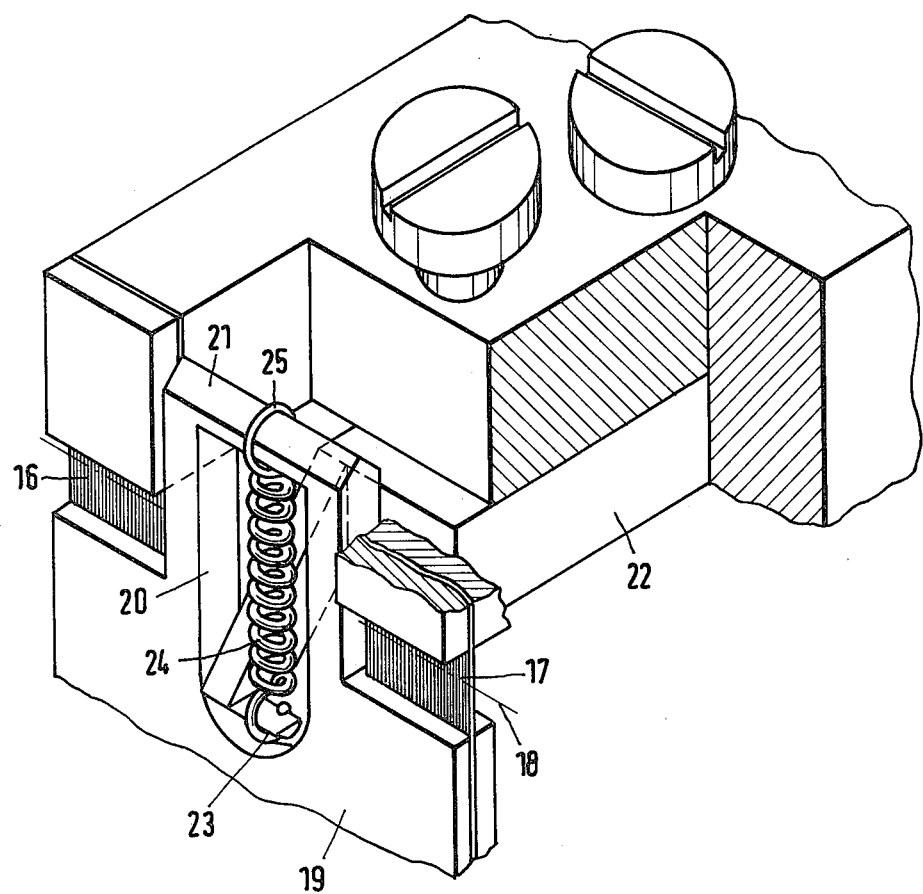
FIG. 2 is an enlarged view of one of the plate spring hinges.

Each of the four hinges is formed of two plate springs 16 and 17 (FIG. 2), whereby each plate spring is rigidly clamped or secured about the pivot axis 18 except for a narrow region. Between the plate springs 16, 17, the link, rocker arm or bar 19 extends somewhat beyond the pivot axis 18 and is provided with a break-through or opening 20, forming a crosspiece 21. An arm of the holder or mounting support 22 projects into the opening 20, with the end of the arm, as a knife-edge, forming one suspension point 23 of a tension or coil spring 24. The second suspension point 25 of the tension spring 24 is located on the crosspiece 21, whereby, in the illustrated rest position, both suspension points are located in the longitudinal direction of the plate springs 16, 17, and are located approximately equidistant from the pivot axis 18. With this arrangement, there is chiefly attained that the tension spring 24 prestresses the plate springs 16 and 17 with a tension or pulling load.

Figure 3:
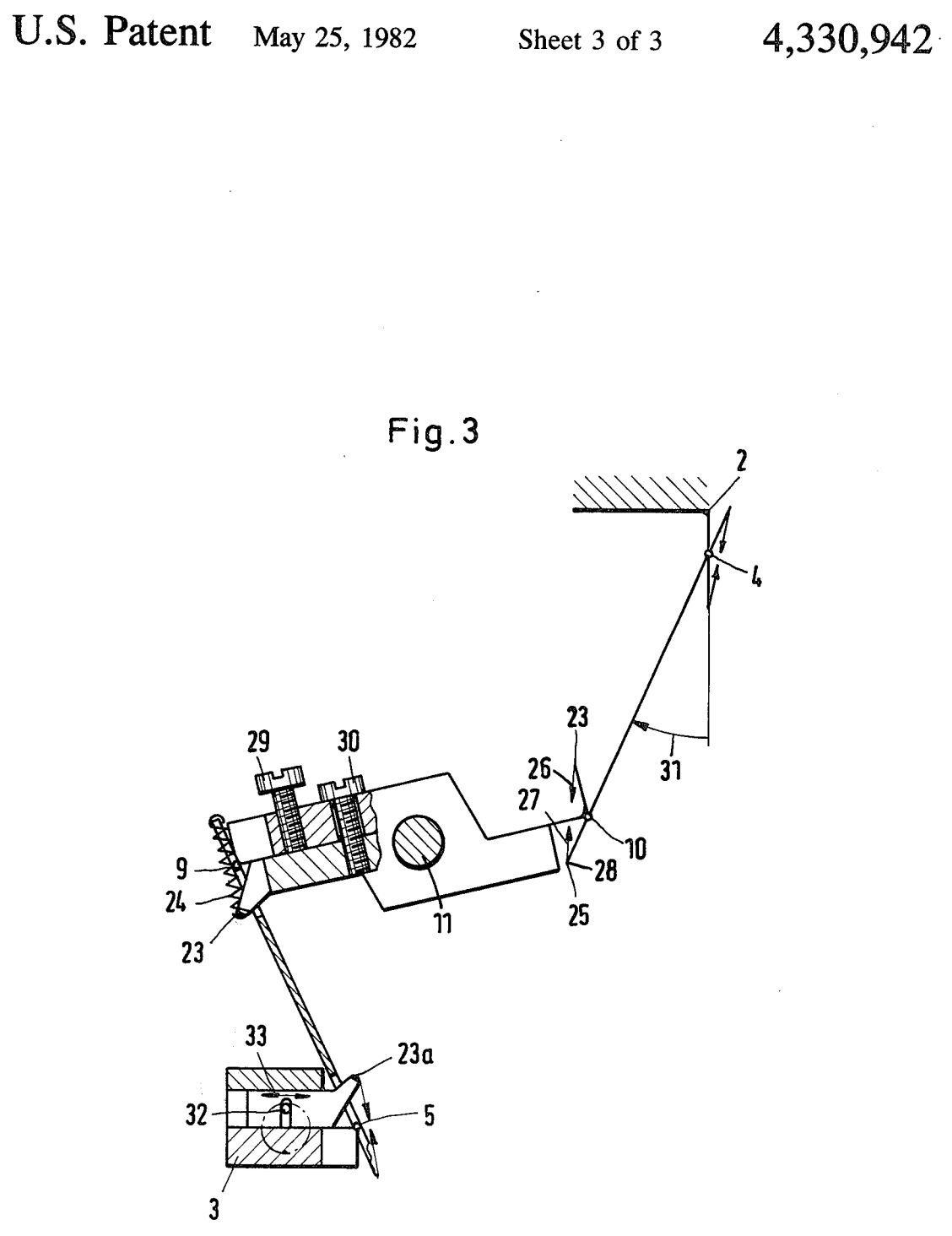

The further operation of the spring mechanism is shown by FIG. 3. The inventive length-measuring probe is shown, for clarification, having an exaggerated deflection, and is illustrated greatly simplified in that sectional plane parallel to the base plate 1 in which the tension springs 24 of all four plate spring hinges lie. These hinges are indicated by their axes 4, 5, 9, and 10, which are at right angles to the sectional plane.

One of the tension springs 24 is reproduced by the appropriate graphical symbol, and the remaining three are each represented by two force vectors 26 and 27 in the manner in which these are effective upon the respective suspension points 23 and 25. As a result, it is especially recognizable that with deflected plate springs, the distance of the suspension points from one another is less than in the rest position, which corresponds to the extended position of the plate springs and is shown in the drawing as the dot-dash line 28. It is also clear that the force vectors generate a torque, with respect to the particular pivot axis, which is counter to the return moment of the deflected plate springs.

So that these moments cancel each other, two adjustment screws 29 and 30 are provided on each hinge. With these adjustment screws 29 and 30, the position of the suspension points 23 can be changed, and hence the tension spring 24 can be accurately adjusted. If in a practical situation the deflection angle 31 from the rest position does not exceed four degrees in each of the two deflection directions, the moment can be compensated in the entire measuring range up to a residual force on the feeler or stylus 11 of barely 0.01 N. It is especially important for the inventive length-measuring probe that this compensation of the return moment be effected directly in each hinge, because in this way no variable forces load the members or bars of the feeler or stylus 11, which forces would otherwise influence the measurement by a corresponding variable deformation or deflection. Even then, this solution is structurally very simple, and neither additional frictional losses nor inertial masses have to be considered.

In a further advantageous arrangement of the present invention, a mechanism 32 is provided on the support 2 or 3, or even on both supports 2 and 3, with which the associated suspension point 23a can be shifted manually in a sensitive manner in the direction of the arrow 33 in such a way that upon engagement of the feeler or stylus against the measuring surface, for example, against the side of a tooth, a desired measuring force exists. This measuring force results from the differential moment as a consequence of the shifting of the point of zero moment of the supplemental spring relative to that of the associated plate springs. This differential moment is constant over the entire measuring range, so that the fluctuations of the measuring force on the feeler or stylus are similarly low as before the adjustment. The direction of the measuring force can also be reversed with the same mechanism 32, so that the feeler or stylus can engage the other side, by shifting the suspension point 23 back to the starting position, and then proceeding in the opposite direction.

The present invention is, of course, in no way restricted to the specific disclosure of the specification and drawings, but also encompasses any modifications within the scope of the appended claims.

What I claim is:

1. A length measuring probe for measuring gears, comprising:
   a feeler;
   a planar four-bar-hinged guide including a base plate and supports for supporting and linearly guiding said feeler, said guide also including four hinges, each of which has a pivot axis and is formed by plate springs which are adapted to occupy a rest position;
   at least one additional, adjustable spring arranged between the plate springs of each hinge in such a way as to prestress said plate springs in said rest position, the spring force of said additional springs decreasing upon deflection of said plate springs in either direction out of said rest position; and
   means operatively connected with said feeler guide for measuring the displacement of said feeler when the latter is in contact with a gear to be measured.

2. A length measuring probe according to claim 1, in which each additional spring is a coil spring having two suspension points, said suspension points, in said rest position of said plate springs, being located in the longitudinal direction of said plate springs and equidistant from the associated pivot axis.

3. A length measuring probe according to claim 1, in which there are two bars of equal length respectively connected to the supports by one of the hinges and thus with said base plate and said two bars forming said planar four-bar-hinged guide including said four hinges.

4. A length measuring probe according to claim 3, in which a coupling bar is connected to free ends of said two bars by two other hinges and thus together with said base plate and two bars forming said planar four-bar-hinged guide including said four hinges, said feeler being fixed to said coupling bar.

* * * * *